US006535620B2

(12) United States Patent
Wildes et al.

(10) Patent No.: US 6,535,620 B2
(45) Date of Patent: Mar. 18, 2003

(54) METHOD AND APPARATUS FOR QUALITATIVE SPATIOTEMPORAL DATA PROCESSING

(75) Inventors: Richard Patrick Wildes, Princeton, NJ (US); James Russell Bergen, Hopewell, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/803,774

(22) Filed: Mar. 12, 2001

(65) Prior Publication Data

US 2001/0043722 A1 Nov. 22, 2001

Related U.S. Application Data

(60) Provisional application No. 60/188,305, filed on Mar. 10, 2000.

(51) Int. Cl.[7] .................................................. G06K 9/00
(52) U.S. Cl. ...................................................... 382/107
(58) Field of Search .................................. 382/128, 130, 382/131, 132, 133, 254, 256, 260, 266, 276, 277, 303, 304; 348/25, 26, 428.1, 429.1, 430.1, 431.1, 439.1, 526, 620, 701, 715, 905; 73/609; 369/124.08; 386/5, 111, 121; 700/55

(56) References Cited

U.S. PATENT DOCUMENTS

| | | | | |
|---|---|---|---|---|
| 4,745,458 A | * | 5/1988 | Hirano et al. ............. | 348/436.1 |
| 4,985,767 A | * | 1/1991 | Haghiri et al. ......... | 375/240.25 |
| 4,989,087 A | * | 1/1991 | Pele et al. ................ | 348/416.1 |
| 5,454,043 A | * | 9/1995 | Freeman ..................... | 382/168 |
| 5,473,384 A | * | 12/1995 | Jayant et al. ................ | 348/470 |

(List continued on next page.)

FOREIGN PATENT DOCUMENTS

| | | | |
|---|---|---|---|
| EP | 1 026 635 | 8/2000 | ............. G06T/7/20 |
| WO | WO 98 21688 | 5/1998 | ............ G06K/9/00 |

OTHER PUBLICATIONS

PCT Search Report, May 3, 2002.

R. H. Jonsson et al.; "Efficient Motion–Oriented Filter Banks for Video Coding"; Proceedings of the International Symposium on Circuits and Systems (ISCS).; Chicago, May 3–6, 1993, New York, IEEE, US, vol. 2, May 3, 1993, pp. 639–642.

R. H. Bamberger; "New Resulsts on Two and Three Dimensional Directional Filter Banks"; Signals, Systems and Computers, 1993; IEEE Comput. Soc.; Nov. 1, 1993, pp. 1286–1290.

PCT Written Opinion, Dec. 31, 2001.

R. Wildes, "A Measure of Motion Salience for Surveillance Applications", IEEE International Conference On Image Processing, 183–187, 1998.

*Primary Examiner*—Andrew W. Johns
*Assistant Examiner*—Shervin Nakhjavan
(74) *Attorney, Agent, or Firm*—William J. Burke

(57) ABSTRACT

The present invention is embodied in a method for representing and analyzing spatiotemporal data in order to make qualitative yet semantically meaningful distinctions among various regions of the data at an early processing stage. In one embodiment of the invention, successive frames of image data are analyzed to classify spatiotemporal regions as being stationary, exhibiting coherent motion, exhibiting incoherent motion, exhibiting scintillation and so lacking in structure as to not support further inference. The exemplary method includes filtering the image data in a spatiotemporal plane to identify regions that exhibit various spatiotemporal characteristics. The output data provided by these filters is then used to classify the data.

21 Claims, 4 Drawing Sheets

U.S. PATENT DOCUMENTS

| | | | |
|---|---|---|---|
| 5,481,308 A | * 1/1996 | Hartung et al. | 375/240.11 |
| 5,512,956 A | * 4/1996 | Yan | 348/606 |
| 5,673,207 A | * 9/1997 | Nomura | 348/701 |
| 5,694,491 A | * 12/1997 | Brill et al. | 382/260 |
| 5,719,966 A | * 2/1998 | Brill et al. | 382/260 |
| 5,828,444 A | * 10/1998 | Nomura | 356/28 |
| RE36,041 E | * 1/1999 | Turk et al. | 382/118 |
| 6,009,200 A | * 12/1999 | Fujita et al. | 382/232 |
| 6,061,100 A | * 5/2000 | Ward et al. | 348/607 |
| 6,192,079 B1 | * 2/2001 | Sharma et al. | 375/240.16 |
| 6,263,089 B1 | * 7/2001 | Otsuka et al. | 382/107 |
| 6,307,560 B1 | * 10/2001 | Kondo et al. | 345/619 |

* cited by examiner

METHOD AND APPARATUS FOR QUALITATIVE SPATIOTEMPORAL DATA PROCESSING

This application claims the benefit of U.S. provisional application Ser. No. 60/188,305 filed Mar. 10, 2000, the contents of which are incorporated herein by reference.

The U.S. Government has a paid-up license in this invention and the right in limited circumstances to require the patent owner to license others on reasonable terms as provided for by the terms of contract no. DAAB07-97-C-J031 awarded by the Department of the Army.

FIELD OF THE INVENTION

The present invention is directed toward the domain of data processing, in particular toward the creation of qualitative, yet semantically meaningful distinctions at the earliest stages of processing of spatiotemporal data sets.

BACKGROUND OF THE INVENTION

When confronted with spatiotemporal data, an intelligent system that processes the data to attempt to make sense of the ensuing stream may be overwhelmed by its sheer quantity. Video and other temporal sequences of images are notorious for the vast amount of raw data that they comprise. If, instead of two-dimensional images, data sets having three or more dimensions in addition to a temporal dimension, such as 3D magnetic resonance images, are processed, even a relatively small time sequence of data may overwhelm even the most powerful computers One method for preventing the processing system from becoming overwhelmed may be to preprocess the data to indicate a measure of salience for different parts of the data with respect to the processing that is to be performed. Previous efforts that have attempted to abstract qualitative descriptors of motion information are relevant as identifying salient regions to be considered in motion processing. Much of this work is motivated by observations suggesting the inherent difficulty of dealing with the visual motion field in a quantitative fashion as well as the general efficacy of using motion in a qualitative fashion to solve useful tasks (e.g., boundary and collision detection). It should be noted, however, that the focus of most of this work is the qualitative interpretation of visual motion or optical flow. In this regard, the salience measure is generated using some of the motion processing steps.

An article by R. Nelson et al. entitled "Qualitative Recognition of Motion Using Temporal Texture," *CVGIP-IU* vol. 56, No. 1, pp 79–89 (1992) describes a method that treats motion information using temporal texture analysis. This method attempts to map spatiotemporal data to primitive, yet meaningful patterns. The analysis performed is based on statistics (e.g., means and variances) defined over normal flow recovered form image sequence intensity data. Furthermore, the patterns that it abstracts to (e.g., flowing water, flutter leaves) are specific and narrowly defined.

Considerable research has been concerned with effecting the recovery of image motion (e.g., optical flow) on the basis of filters that are tuned for local spatiotemporal orientation. Filter implementations that have been employed to recover estimates of spatiotemporal orientation include angularly tuned Gabor, lognormal and derivative of Gaussian filters. Also of relevance is the notion of opponency between filters that are tuned for different directions of motion, as disclosed in an article by R. Wildes "A Measure of Motion Salience for Surveillance Applications" *Proceedings of the IEEE Conference on Image Processing*, pp. 183–187 (1998). An essential motivation for taking such an operation into account is the close correspondence between the difference in the response of filters tuned to opposite directions of motion (e.g., leftward vs. rightward) and optical flow along the same dimension (e.g., horizontal).

Previous work also has been concerned with various ways of characterizing local estimates of spatiotemporal orientation. One prominent set of results along these lines has to do with an eigenvalue analysis of the local orientation tensor as disclosed in an text by G. Granlund et al entitled *Signal Processing for Computer Vision*, Kluwer Academic Publishers (1995). One goal of this analysis is to characterize the dimensionality of the local orientation as being isotropic, line or plane-like in order to characterize the local spatial structure with respect to motion analysis (e.g., distributed vs. oriented spatial structure with uniform motion).

SUMMARY OF THE INVENTION

The present invention is embodied in a method for generating a plurality of relevant spatiotemporal descriptors for a time sequence of multi-dimensional data sets. The method filters a volume of scalar quantities of the sequence of data sets corresponding to the time dimension and at least one dimension using a plurality of oriented filter characteristics. The filtered volume produces a plurality of spatiotemporal filter values corresponding to the scalar quantities of the data sets. The method determines the plurality of relevant spatiotemporal descriptors for the sequence of multi-dimensional data sets from the plurality of spatiotemporal filter values.

DETAILED DESCRIPTION

Figure 1A:
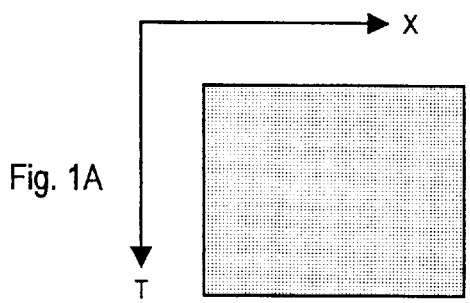
FIGS. 1A, 1B, 1C, 1D, 1E and 1F are image diagrams representing spatiotemporal data along a single spatial dimension.

The present invention concerns methods for decomposing spatiotemporal data according to its local first-order correlation structure for the purposes of assigning descriptors that are meaningful for subsequent processing. To simplify the explanation of these processes, the description that follows concerns a method for filtering time sequences of one-dimensional and two-dimensional image data along axes that are parallel to the x, y and t axes of the volume of data. It is contemplated, however, that the invention has much broader application. It may be applied to time sequences of data in more than two dimensions applying directional filtering that follows axes which are determined dynamically from the local correlation structure of the data.

One exemplary embodiment of the invention defines a small set of primitive classes of spatiotemporal structure based on the sequence of two-dimensional images that correspond to categories of stationary, coherently moving, incoherently moving, flickering, scintillating and "too unstructured to support further inference". It is contemplated, however that either more or fewer classes may be defined, at least in part, based on the type of processing to be performed on the data. The materials that follow describe how these classes can be represented and distinguished in a uniform fashion in terms of oriented energy signatures.

The present invention is advantageous over prior image classification methods because it abstracts away from local analysis to information of more direct significance to subsequent processing. More generally, the present invention provides the following advantages: (i) it provides, from a theoretical point of view, a semantically meaningful decomposition of received spatiotemporal information. (ii) it provides a vehicle for a practical understanding of image classification that has the potential to impact real world image understanding and analysis applications.

The present invention concerns the qualitative analyses of spatiotemporal patterns that captures salient and meaningful categories of structure and which are easily recovered from raw data. These categories capture distinctions along the following exemplary lines: What is moving and what is stationary? Are the moving objects moving in a coherent fashion? Which portions of the data are best described as scintillating and which portions are simply too unstructured to support subsequent analysis? More generally, given a spatiotemporal region of interest, one may seek to decompose it into a combination of such components. Significantly, it is shown that all of these distinctions can be based on a unified representation of spatiotemporal information in terms of local (spatiotemporal) correlation structure.

The ability to parse a stream of spatiotemporal data into primitive, yet semantically meaningful, categories at an early stage of analysis can benefit subsequent processing in a number of ways. A parsing of this type can support cueing and focus of attention for subsequent analysis. Limited computational resources could thereby be focused on portions of the input data that will support the desired analysis. For example, using the present invention, spatiotemporal areas that are too unstructured to support detailed motion analysis can be quickly identified and discarded. Similarly, appropriate models to impose during subsequent analysis (such as for model-based motion estimation) can be selected and initialized based on the specific spatiotemporal characteristics of the data. Further, the underlying representation can provide the basis of descriptors to support the indexing of video or other spatiotemporal data. The relative distribution of a spatiotemporal region's total energy across the defined primitives might serve as a characteristic signature for initial database construction as well as subsequent look-up. Also, in certain circumstances the proposed analysis may serve directly to guide intelligent action relative to the impinging environment. Certain primitive reactive behaviors (say, pursuit or flight) might be triggered by the presence of certain patterns of spatiotemporal structure (say, patterns indicative of large moving regions). One aspect of the present invention is a method of qualitative spatiotemporal analysis that supports such applications.

In this section, an exemplary embodiment of the proposed approach to spatiotemporal analysis is described, accompanied by natural image examples. For the purposes of exposition, the description begins by restricting consideration to one spatial dimension plus time. Subsequently, the analysis is generalized to encompass an additional spatial dimension and issues involving spatiotemporal boundaries.

The local orientation (or lack thereof) of a pattern is one of its most salient characteristics. From a purely geometric point of view, orientation captures the local first-order correlation structure of a pattern. In the realm of image analysis, local spatiotemporal orientation often can be interpreted in a fashion that has additional ramifications. For example, image velocity is manifest as orientation in space-time. The first embodiment of the invention is described in terms of one spatial dimension, the horizontal image axis, X, and time, T, as shown in FIG. 1A. The images in FIGS. 1A through 1F show X-T-slices of several prototypical spatiotemporal patterns that are particular interest. Each of these images shows a one-line slice of a video image taken across several video frames.

Figure 1G:
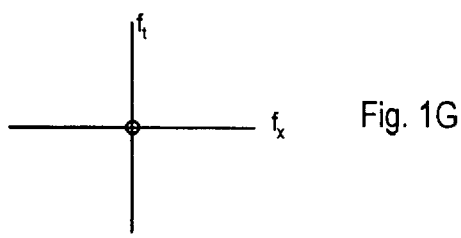
FIGS. 1G, 1H, 1I, 1J, 1K and 1L are graphs of spatial frequency versus temporal frequency that are useful for describing the spatiotemporal content of the images shown in FIGS. 1A, 1B, 1C, 1D, 1E and 1F, respectively.

Perhaps the simplest situation that might hold is that a region is essentially devoid of structure, i.e., image intensity is approximately constant or slowly varying in both the spatial and temporal directions, as shown in FIG. 1A. In the spatiotemporal frequency domain, such a pattern has the majority of its energy concentrated at the origin, as shown in FIG. 1G. When such regions occur where local contrast is small they can indicate an underlying smoothness in the material that is being imaged. For subsequent processing operations it may be desirable to flag such areas as lacking sufficient information to support stable estimates of certain image properties. For example, image registration can be led astray by blindly attempting to align structureless regions. In the materials that follow, this category is referred to as "unstructured".

Figure 1B:
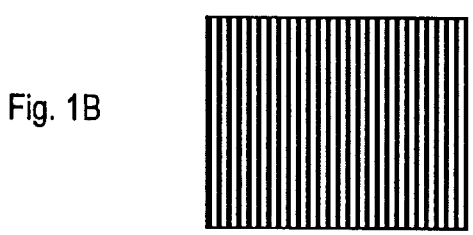
Figure 1H:
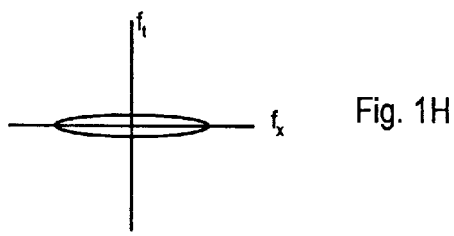

Locally oriented structures are quite common in spatiotemporal data. Here, there are several situations that are useful to distinguish. From a semantic point of view, it is of particular interest to categorize the patterns according to the direction of their dominant orientation. One case of interest is that which arises for the case of (textured) stationary objects as shown in FIG. 1B. These image sequences show elongate structure in the spatiotemporal domain that is parallel to the temporal axis, i.e., features exhibit no shift in position with the passage of time. In the frequency domain, as shown in FIG. 1H, their energy is concentrated along the spatial frequency axis $f_x$. This case is referred to as "static".

Figure 1C:
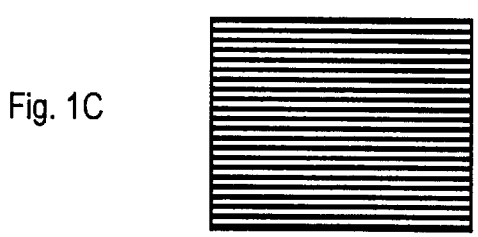
Figure 1I:
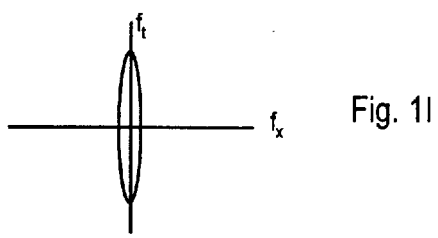
Figure 1D:
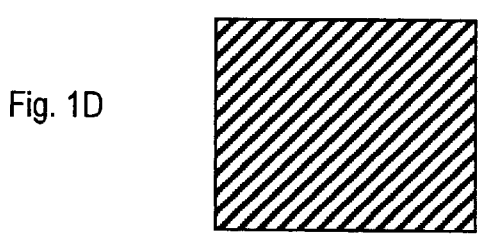

A second case of interest is that of homogenous spatial structure, but with change in intensity over time (for example, overall change in brightness due to temporal variation in illumination) as shown in FIG. 1C. Here, the spatiotemporal pattern is oriented parallel to the spatial axis. Correspondingly, in the frequency domain the energy is concentrated along the temporal frequency axis, $f_t$. This case is referred to as "flicker".

Figure 1J:
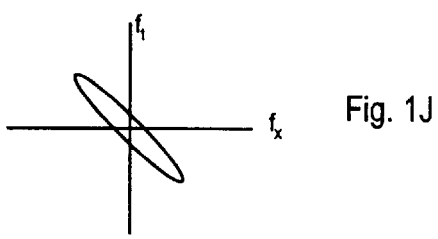

A third case of interest is that of objects that are in motion. As noted above, such objects trace a trajectory, shown in FIG. 1D, that is slanted in the spatiotemporal domain in proportion to their having both spatial and temporal variation. Such simple motion that is (at least locally) manifest by s single dominant orientation will be referred to as "coherent motion". FIG. 1J is a frequency domain representation of the coherent motion shown in FIG. 1D.

Figure 1E:
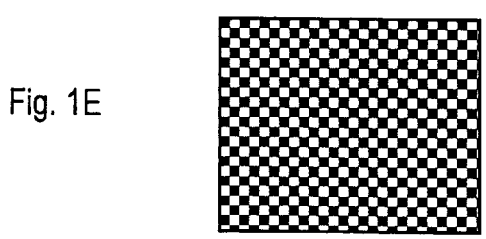
Figure 1K:
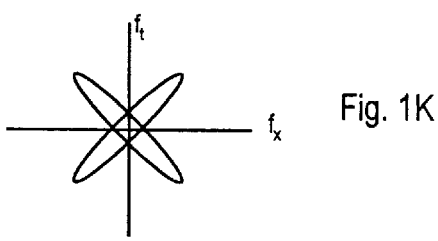

It is also useful to distinguish a special case of oriented structure, that of multiple local orientations intermixed or superimposed within a spatial region. Examples of this are shown in FIG. 1E. In this regard, there is motivation to concentrate on the case of two structures both indicative of motion. Such a configuration has perceptual significance corresponding to oscillatory motion (shown in FIG. 1E), shear and occlusion boundaries, and other complex motion phenomena that might be generally thought of as dynamic local contrast variation with motion. Interestingly, it appears that human vision represents this category as a special case as suggested by the perception of counterphase flicker. In the frequency domain the energy distribution will be the sum of the distributions that are implied by the component motions, as shown in FIG. 1K. This case is referred to as "incoherent motion". In comparison, there does not seem to be anything significant about something that is both static and flickering, beyond its decomposition into those primitives. The classification of the data as exhibiting coherent motion or incoherent motion it only exemplary. It is contemplated that more complex motion patterns may also be discerned, corresponding to combinations of multiple orientations across arbitrary distributions.

Figure 1F:
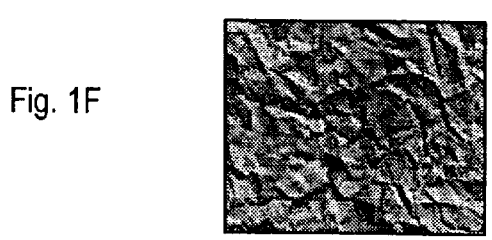
Figure 1L:
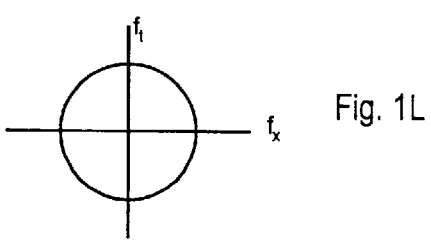

The final broad class of spatiotemporal pattern to be considered is that of isotropic structure. In this case, no discernable orientations dominate the local region; nevertheless, there is significant spatiotemporal contrast, as shown in FIG. 1F. The frequency domain manifestation of the pattern also lacks a characteristic orientation, and is likewise isotropic, as shown in FIG. 1L. Situations that can give rise to this type of structure are characteristically stochastic or chaotic in nature. Natural examples include turbulence and the glint of specularities on water. Owing to the perceptual manifestation of these phenomena, this case will be referred to as "scintillation".

The essence of the proposed approach is to analyze any given sample of spatiotemporal data as being decomposed along the dimensions of the adduced categories: unstructured, static, flicker, coherent motion, incoherent motion and scintillation. While it is possible to make finer distinctions (e.g., exactly what the numerical value of the space-time orientation is), at the level of qualitative semantics these are fundamental distinctions to be made: Is something structured or not? If it is structured, does it exhibit a characteristic orientation or is it more isotropic and thereby scintillating in nature? Are oriented patterns indicative of something that is stationary, flickering or moving? Is the motion coherent or incoherent? Further, as set forth above, additional distinctions may also be made within the proposed framework. In any case, it should be noted that each of the descriptions identified above is attached to the visual signal within a specified spatiotemporal region. The choice of this region generally affects the description assigned. For example, the motion of leaves in the wind may be coherent if analyzed over a small area and time but incoherent over a larger area or time. An alternative way to think about the proposed decomposition is to consider it from the point of view of signal processing: In particular, what sort of decomposition (e.g., in the frequency domain) does it imply. This topic is dealt with below in terms of a representation that captures the proposed distinctions.

Given that the concern of the exemplary embodiment of the invention is to analyze spatiotemporal data according to its local orientation structure, a representation that is based on oriented energy is appropriate, although other representations that capture the local distribution of orientations in a pattern also could be applied. Such a representation entails set of filter characteristics that divides the spatiotemporal signal into a set of oriented energy bands. In general, the size and shape of the filter spectra determine the way that the spatiotemporal frequency domain is covered. In the present case, a family of relatively broadly tuned filter characteristics is appropriate due the interest in qualitative analysis. The idea is to choose a spatial frequency band of interest with attendant low pass filtering in the temporal domain. This captures orientation orthogonal to the spatial axis. On the basis of this choice, a temporal frequency band can be specified based on the range of dynamic phenomena that are interest for the given spatial band. This captures structure that is oriented in directions indicative of motion, e.g., a spatiotemporal diagonal. Finally, these characteristics can be complemented by considering just the temporal frequency band while spatial frequency is covered with a low-pass response. This captures structure that is oriented orthogonal to the temporal axis. Thus, it is possible to represent several principle directions in the spatiotemporal domain while systematically covering the frequency domain.

The simplification realized by analyzing spatiotemporal structure in a two dimensional representation (i.e., on spatial and one temporal dimension) requires somehow addressing the remaining spatial dimension since the input data consists of a three dimensional volume. This is done by low-pass filtering the data in the orthogonal spatial direction using, for example, a 5-tap binomial filter having weights defined as [1 4 6 4 1]/16. This filtering allows for analysis of the other spatiotemporal plane (i.e. that containing ht orthogonal spatial dimension) in an exactly analogous manner. In a multi-dimensional system, it may be desirable to smooth the data set along other dimensions prior to applying the directional filter along the selected dimensions.

In the remainder of this section a choice of filters is presented for a given frequency response, i.e., scale of spatial structure. The chosen filters are exemplary only, even within the time sequence of two-dimensional image data, other filters may be used in place of or in addition to the described filters.

The desired filtering can be implemented in terms of second derivative of Gaussian filters, $G_{2\theta}$ at orientation $\theta$ (and their Hilbert transforms, $H_{2\theta}$). The motivation for this choice is twofold. First, while selective for orientation, the tuning of these filters is moderately broad and therefore well suited to the sort of qualitative analysis that is the focus of the current research. Second, they admit a steerable and separable implementation that leads to compact and efficient computation. The filters are taken in quadrature (i.e., for any given $\theta$, $G_{2\theta}$ and $H_{2\theta}$ in tandem) to eliminate phase variation by producing a measure of local energy, $E_\theta(x.t)$ within a frequency band, according to equation (1)

$$E_\theta(x,t)=(G_{2\theta}(x,t)*I(x,t))^2+(H_{2\theta}(x,t)*I(x,t))^2 \qquad (1)$$

In particular, to capture the principle orientations described above, filtering is applied (i) oriented orthogonally to the spatial axis ($\theta=90°$), (ii) orthogonally to the temporal axis ($\theta=0°$) and (iii, iv) along the two spatiotemporal diagonals ($\theta=45°$ and $\theta=135°$). These orientations are exemplary. It is contemplated that other orientations, even non-orthogonal orientations may be used. Because the frequency response plots of these filters sweep out an annulus in that domain; these filters admit to a multiscale extension which systematically alters the inner and outer rings of the annulus to effectively cover the frequency domain. Finally, note that at given frequency the value of any one oriented energy measure is a function of both orientation and contrast and therefore rather ambiguous. To avoid this confound and get a purer measure of orientation the response of each filter should be normalized by the sum of the consort, as shown in equation (2).

$$\hat{E}_{\theta i}(x, t) = \frac{E_{\theta i}}{\sum_i E_{\theta i}(x, t) + \varepsilon} \quad (2)$$

where $\varepsilon$ is a small bias to prevent instabilities when overall energy is small. (Empirically we set this bias to about 1% of the maximum (expected) energy, although it is contemplated that other relatively small values may be chosen.)

The exemplary operations have been implemented in terms of a steerable filter architecture. The essential idea here is to convolve an image of interest with a set of n basis filters, with n=3 for the second derivative of Gaussians of concern. Subsequently the basis filtered images are combined according to interpolation formulas to yield images filtered at any desired orientation, $\theta$. Processing with the corresponding Hilbert transforms is accomplished in an analogous fashion, with n=4. To remove high frequency components that are introduced by the squaring operation in forming the energy measurement (1), the previously introduced 5-tap binomial low-pass filter is applied to the result, $E_\theta$. Details of the filter implementations are described below with reference to FIG. 3.

Figure 2:
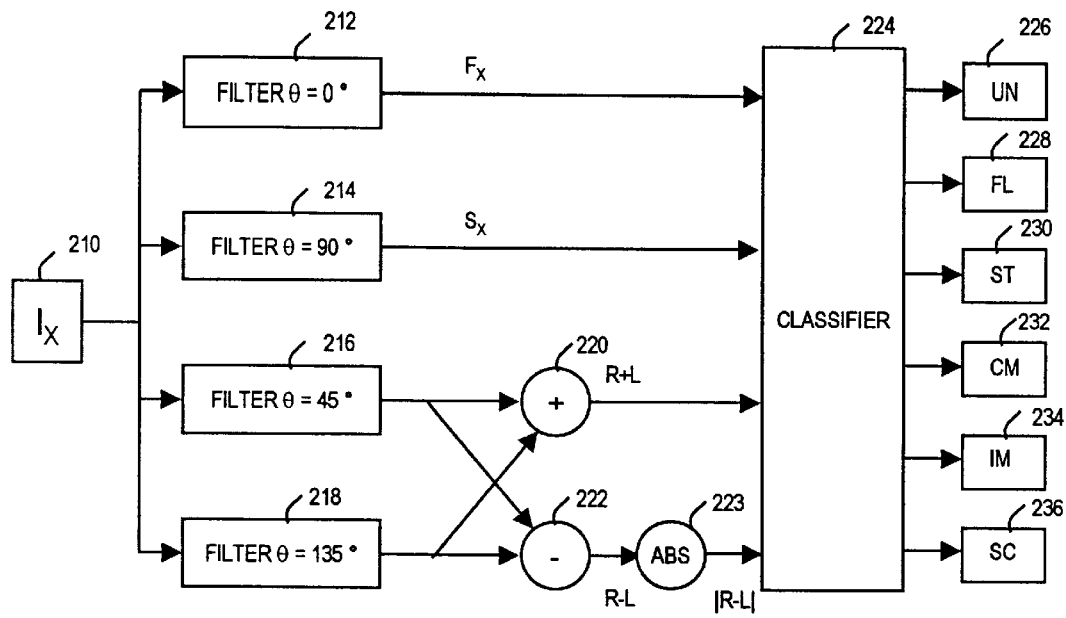
FIG. 2 is a block diagram of an exemplary image classifier according to a first embodiment of the invention.

FIG. 2 is a block diagram of a filtering circuit suitable for use to classify an image sequence into the six categories described above. The filter circuit receives a one-dimensional spatiotemporal image $I_X$ from source 210. As described above, the image $I_X$ has been prefiltered in the y coordinate direction by the five-tap binomial filter. The spatiotemporal image $I_X$ is provided to four filters 212, 214, 216 and 218, in parallel. Filter 212 is the flicker filter and is oriented at 0°. Filter 214 is the static filter and is oriented at 90°. Filters 216 and 216 are the Left and Right filters and are oriented at 45° and 135°, respectively. The output signals of filters 212 and 214 are applied directly to a classifier 224 while the output signals of the filters 216 and 218 are summed in an adder 220 to form the signal R+L and differenced in a subtracter 222, the output signal of which is applied to an absolute-value circuit 223 to generate the signal |R−L|. Note, however, that an alternative realization may be based directly on the R and L responses, without the sum and difference operations. Further, the primitive filter responses may be combined in other ways, for example, using principle components analysis. The classifier 224 uses the relative amplitudes of these signals, as described below with reference to Table 1, to assign each pixel in the spatiotemporal image to one or more of six image memories, the unstructured memory 226, the flicker memory 228, the static memory 230, the coherent motion memory 232, the incoherent motion memory 234 and the scintillation memory 236. These classifications are exemplary only. It is contemplated that other classifications may be used that result in more or fewer memories.

Figure 3:
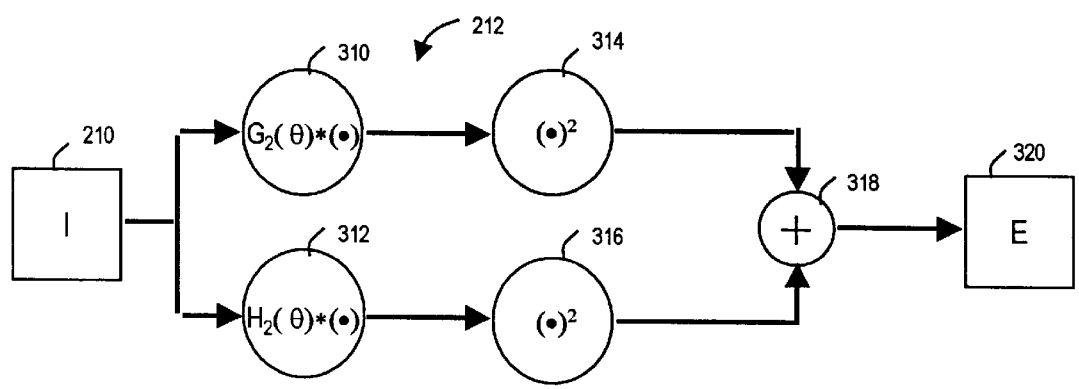
FIG. 3 is a block diagram of a filter suitable for use as one of the filters shown in FIG. 2 or FIG. 4.

FIG. 3 is a block diagram of one of the filters 212, 214, 216 and 218. As described above, the filter applies the spatiotemporal pixels from source 210 to an oriented second derivative of Gaussian, $G_2(\theta)$ 310 and to its Hilbert transform, $H_2(\theta)$ 312, in parallel. The filtered outputs are rectified via pointwise squaring in the circuits 314 and 316, respectively. It is contemplated that other approaches to rectification may be used. The rectified versions are summed pointwise to yield an oriented energy image, E 320. Discrete implementation of the $G_2(\theta)$ filter for $\theta=0$ is given along the horizontal via [0.0094, 0.1148, 0.3964, −0.0601, −0.9213, −0.061, 0.3964, 0.1148, 0.0094] and along the vertical via [0.0008, 0.0176, 0.1660, 0.6383, 1.0, 0.6383, 0.1660, 0.0176, 0.0008]. Discrete implementation of the $H_2(\theta)$ filter for $\theta=0$ is given along the horizontal via [0.0098, 0.0618, −0.0998, −0.7551, 0.0, 0.7551, 0.0998, −0.0618, −0.0098] and along the vertical via [0.0008, 0.0176, 0.1660, 0.6383, 1.0, 0.6383, 0.1660, 0.0176, 0.0008]. Appropriate rotations of the kernels allow for filtering at other values of $\theta$. The terms "horizontal" and "vertical" as used herein refer not to the x and y axes but to an arbitrary plane selected for directional filtering. In the exemplary embodiment of the invention, this plane may include components of the x, y and t axes.

The final oriented energy representation that is proposed is based directly on the basic filtering operations that have been described. Indeed, given the class of primitive spatiotemporal patterns that are to be distinguished, one might imagine simply making use of the relative distribution of (normalized) energies across the four proposed orientation tuned bands as the desired representation. In this regard, it is proposed to make use of two of these bands directly. In particular, the result of filtering an input image with the filter oriented orthogonally to the spatial axis will be one component of the representation, let it be called the "Sx-image" (for static). Second, let the result of filtering an input image with the filter oriented orthogonally to the temporal axis be the second component of the representation and call it the "Fx-image" (for flicker). Due to the characteristic highlighting of particular orientations, these (filtered) images are well suited to capturing the essential nature of the patterns for which they are named.

The information provided individually by the remaining two bands is ambiguous with respect to the desired distinctions between, e.g., coherent and incoherent motion. This state of affairs can be remedied by representing these bands as summed and differenced (i.e., opponent) combinations. Thus, let R−L and R+L stand for opponent and summed images respectively, formed by taking the pointwise arithmetic difference and sum of the images that result from filtering an input image with the energy filters oriented along the two diagonals. It can be shown that the opponent image (when appropriately weighted for contrast) is proportional to image velocity and has a strong signal in areas of coherent motion. It is for this reason that the notation R and L is chosen to underline the relationship to rightward and leftward motion. For present purposes the absolute value of the opponent signal, |R−L|, is used as the third component of the proposed representation since this allows for coherency always to be positive, although it may be desirable to retain the sign for a particular data set or for a particular filtering operation. Finally, the fourth component of the representation is the summed (motion) energy R+L. This image is of importance as it captures energy distributions that contain multiple orientations that are individually indicative of motion and is therefore of importance in dealing with incoherent motion phenomena.

As this point it is interesting to revisit the primitive spatiotemporal patterns of interest and see how they project onto the four component oriented energy representation comprised of $S_X$, $F_X$, |R−L| and R+L. This relationship is shown in Table 1.

TABLE 1

|  | Un-structured | Static | Flicker | Coherent Motion | Incoherent Motion | Scintillation |
|---|---|---|---|---|---|---|
| \|R − L\| | 0 | 0 | 0 | ++ | 0 | 0 |
| R + L | 0 | ++ | ++ | ++ | ++++ | ++ |

TABLE 1-continued

|  | Un-structured | Static | Flicker | Coherent Motion | Incoherent Motion | Scintillation |
|---|---|---|---|---|---|---|
| $S_x$ | 0 | ++ | 0 | + | + | + |
| $F_x$ | 0 | 0 | ++ | ++ | + | + |

In the unstructured case, it is expected that all of the derived images will contain vanishingly small amounts of energy. Notice that for this to be true and stable, the presence of the bias factor, $\epsilon$, in the normalization process is important in avoiding division by a very small factor. For the static case, not surprisingly the $S_x$-image contains the greatest amount of energy. Although, there also is a moderate energy from the R+L image as the underlying R and L responses are present due to the operative orientation tuning. In contrast, these responses very nearly cancel to leave the |R−L| image essentially zero. Similarly, the orthogonal $F_x$ image has essentially no intensity. The flicker case is similar to the static case, with the $S_x$ and $F_x$ images changing roles.

For the case of coherent motion, the |R−L| image has a large amount of energy present. Indeed, this is the only pattern where the image is expected to contain any significant energy. The R+L-image also shows an appreciable response, with the other images showing more moderate responses.

For the case of incoherent motion, the R+L-image should dominate as both the underlying R and L responses should be appreciable. Again, due to finite bandwidth tuning the $S_x$ and $F_x$ images also show moderate responses. Once again the |R−L| image should be very nearly zero.

Finally, of the case of scintillation the $S_x$ and $F_x$ images show modest, yet still appreciable responses. The R+L-image response is somewhat larger, perhaps by a factor of two as each of the modest R and L responses sum together. Essentially no response is expected from the |R−L| image. Significantly, when one compares all the signatures, each is expected to distinct from the others, at least for the idealized prototypical patterns.

A set of natural image sequences have been gathered that provide one real world example of each of the proposed classes of spatiotemporal structure. A featureless sky is used for the unstructured case. For the static case the image sequence shows a motionless tree. The third case, flicker, is given as a smooth surface of human skin as lightning flashes over time. Coherent motion is captured by a field of flowers that appear to move diagonally upward and to the right due to camera motion. Incoherent motion is captured by a sequence of images of overlapping legs in very complex motion (predominantly, but not entirely, horizontal motion). The last case, scintillation, uses via a sequence of rain striking a puddle. All of the image sequences had horizontal, x, and vertical, y, length both equal to 64 while the temporal length (i.e., number of frames) was 40. All of the spatiotemporal image volumes were processed in an identical fashion by bringing them under the proposed oriented energy representation, as described in the previous section. This resulted in each original image being decomposed along the four dimensions, |R−L|, R+L, Sx and Fx.

The results of the analysis are shown in Table 2.

TABLE 2

|  | Un-structured | Static | Flicker | Coherent Motion | Incoherent Motion | Scintillation |
|---|---|---|---|---|---|---|
| |R − L| | 0.00 | 0.00 | 0.00 | 0.37 | 0.05 | 0.02 |
| R + L | 0.01 | 0.40 | 0.36 | 0.53 | 0.58 | 0.50 |
| $S_x$ | 0.00 | 0.55 | 0.00 | 0.21 | 0.17 | 0.25 |
| $F_x$ | 0.00 | 0.04 | 0.63 | 0.26 | 0.25 | 0.23 |

In each cell, the average (normalized) energy is shown for the entire spatiotemporal volume. (Note that due to the presence of the bias, $\epsilon$, the sum of R+L, $S_x$ and $Fx_x$ does not necessarily sum exactly to unity.) In reviewing the results it is useful to compare the recovered distribution of energies with the predictions that are shown in Table 1.

Beginning with unstructured case, it is seen that all of the recovered energies are vanishingly small, exactly as predicted. The static case also follows the pattern predicted In Table 1. For this case it is interesting to note that the deviation from zero in the $F_x$ component is due to some fluttering (i.e., scintillation) in the leaves of the tree.

The flicker case also performs much as expected, with a bit more energy in the $F_x$ component relative to the R+L component than anticipated. For the case of coherent motion the pattern of energy once again follows the prediction closely. Here it is important to note that the depicted motion is not strictly along the horizontal axis, rather it is diagonal. This accounts for the value of R+L being somewhat larger than |R−L| as the underlying L channel has a nonzero response.

For the incoherent case, it is seen that while the general trend in the distribution of energies is consistent with predictions, the magnitude of R+L is not as large as expected. Examination of the data suggest that this is due to the $F_x$ component taking on a larger relative value than expected due to the imposition of some flicker in the data as some bright objects come into and go out of view (e.g., bright props and boots that the people wear).

Finally, the case of scintillation follows the predictions shown in Table 1 quite well. Taken on the whole, these initial empirical results support the ability of the proposed approach to make the kinds of distinctions that have been put forth. Clearly the utility of the representation depends on its ability to distinguish and identify populations of samples corresponding to the various semantic categories described.

The approach that has been developed so far can be extended to include the vertical dimension, y, by augmenting the representation with a set of components that capture oriented structure in y-t image planes. The same set of oriented filters that were used previously are now applied to y-t planes, as before with the addition of a low-pass characteristic in the orthogonal spatial dimension, now x. This allows for (normalized) oriented energy to be computed in the four directions: (i) oriented orthogonally to the spatial axis, y, (ii) oriented orthogonally to the temporal axis, t and (iii, iv) along the two y-t diagonals, once again, additional or different directions may be considered. These energy computations are performed for an input image using the y-t counterparts of formulas (1) and (2). The resulting filtered images are then used to complete the representation in a way entirely analogous to that used for the horizontal case except with U and D (for up and down) replacing R and L.

Figure 4:
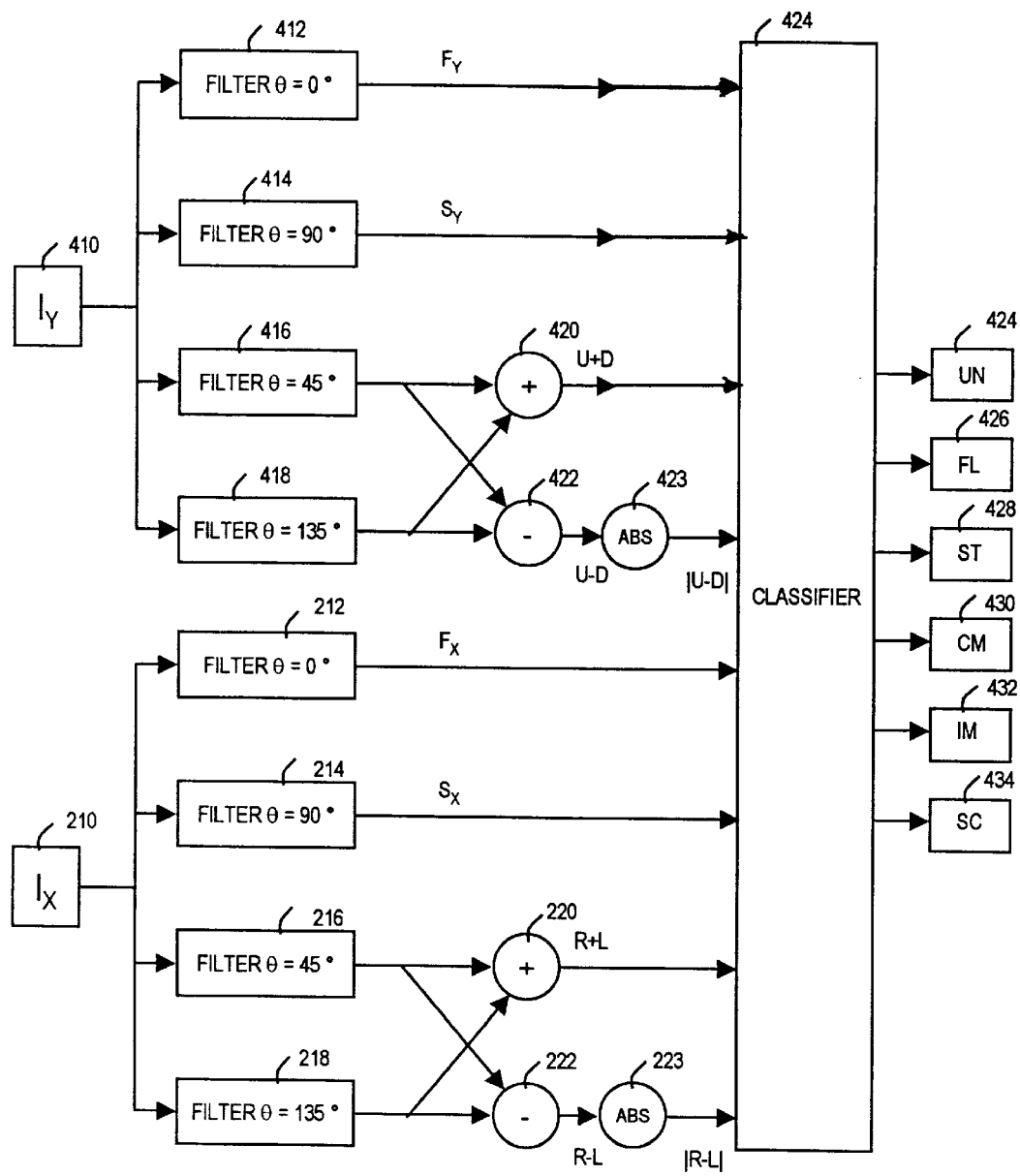
FIG. 4 is a block diagram of an exemplary image classifier according to a second embodiment of the invention.

To illustrate these extensions, FIG. 4 shows an exemplary filtering architecture that encompasses two spatial dimensions plus time. The filter includes the horizontal source $I_x$ 220 as well as the horizontal filters 212, 214, 216 and 218, described above with reference to FIG. 2. In addition, it includes the adder 220, subtracter 222 and the absolute value circuit 423. In addition, the circuit includes a corresponding vertical source $I_y$ 410, vertical filters 412, 414, 416 and 418 as well as an adder, 420, a subtracter 422 and an absolute value circuit 423. The classifier 424 is modified to accept eight filtered output signals $F_y$, $S_y$, U+D, |U−D|, $F_x$, $S_x$, R+L and |R−L| to generate the six classified images in the memories 424, 426, 428, 430, 432 and 434. Further, it is contemplated that combinations of spatial and temporal directions may be employed, for example, filtering along a plane that is defined by a line diagonal in the x-y dimension plus time or by a line across x, y and t and a dimension orthogonal (or at another angle) to the line.

As an example of how the proposed representation can be used for early segmentation of the input stream, we consider the detection of spatiotemporal boundaries. Differential operators matched to the juxtaposition of different kinds of spatiotemporal structure can be assembled from the primitive filter responses, R−L, R+L, Sx, Fx and their vertical (i.e., y-t) counterparts. To illustrate this concept, consider the detection of (coherent) motion boundaries. Here, the intent is not to present a detailed discussion of motion boundary detection, but to use it as an example of the analysis of spatiotemporal differential structure in general.

Figure 5:
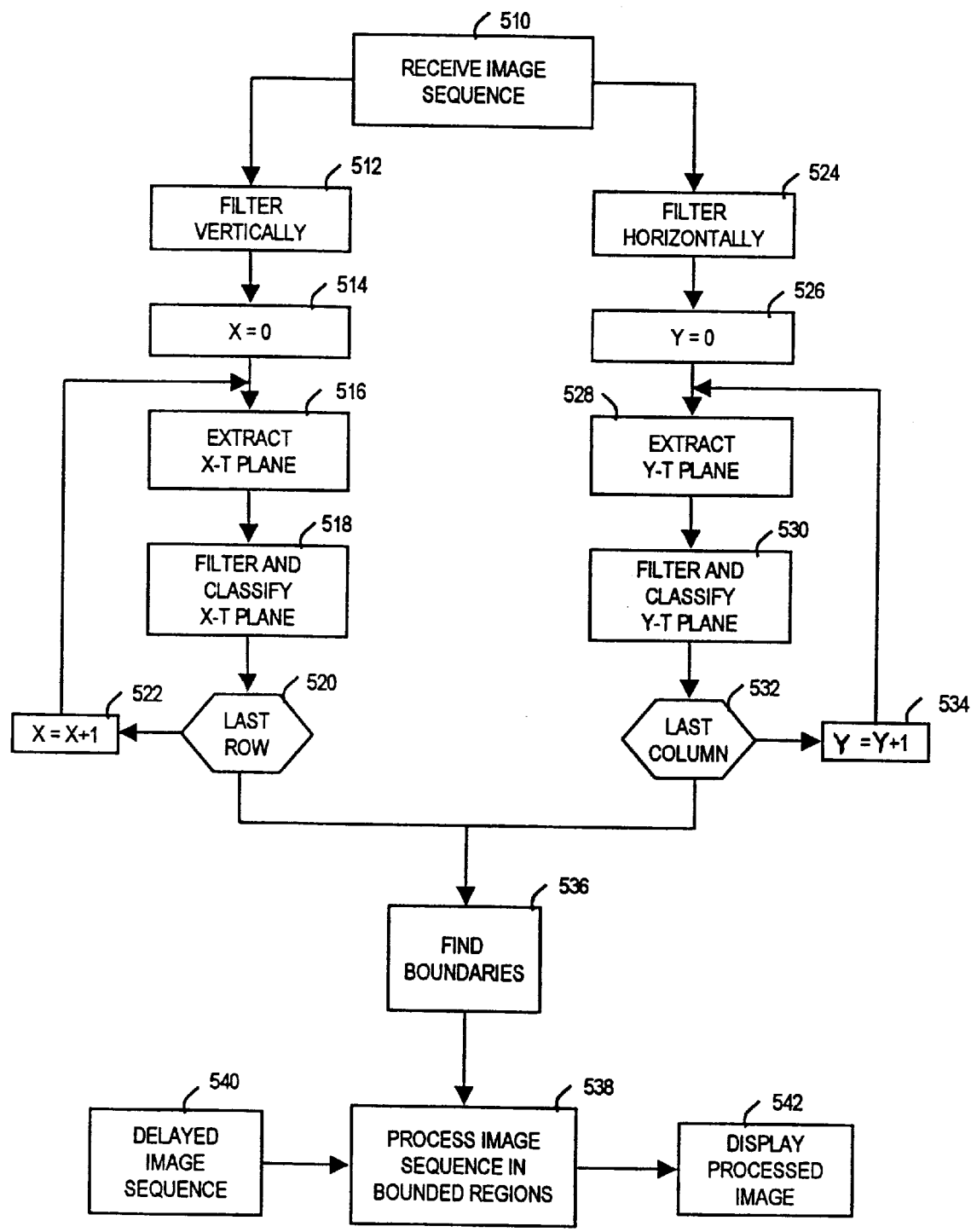
FIG. 5 is a flow-chart diagram of an exemplary image processing system according to the present invention.

Coherent motion is most directly related to the opponent filtered images R−L and U−D. Correspondingly, the detection of coherent motion boundaries is based on the information in these images. As shown in FIG. 5, combining a difference of Gaussians operator, as shown in expression (3)

$$G(x, y, \sigma_1) - G(x, y, \sigma_2) \quad (3)$$

(where G(x, y, σ) is a Gaussian distribution with standard deviation σ), with motion opponent signals yields a double opponency: The pointwise opponency R−L is combined with a spatial opponency provided by the difference of Gaussians and similarly for U−D. As in difference of Gaussian based edge-detection, the zero-crossings in the convolution of expression (3) with R−L and U−D are indicative of boundaries in these inputs. Final boundary detection is based on the presence of a zero-crossing in either of the individual results $(G(x, y, \sigma_1) - G(x, y, \sigma_2))*(R-L)$ or $(G(x, y, \sigma_1) - G(x, y, \sigma_2))*(U-D)$. Alternative methods may be used to distinguish the boundaries of coherent motion via application of other spatiotemporal filters that are matched for differential structure in coherent motion.

FIG. 5 is a flow-chart diagram that shows how the subject invention may be used to process real-world video image sequences. The process begins at step 510 which receives the image sequence. Because the subject invention operates on a time sequence of video images, a predetermined number (e.g. 40) of sequential images are accumulated before processing begins. Although, filtering may begin as soon as the first image arrives, even though a certain number of images would need to be accumulated prior to the production of an answer. Once this number of images has been received, processing may continue as each new frame is received. Step 510 splits the analysis into two paths, the steps beginning with step 512 filter the image sequence along the x-t plane while steps beginning with step 524 filter the image sequence along the y-t plane. Step 512 begins the horizontal filtering by filtering the each of the images in the sequence vertically using the five-tap binomial filter, as described above. Image pixels near the top and bottom of the image may be mirrored to fill out the filter kernel. At step 514, an index variable, indicating a line number of the image, is set to zero. At step 516, the x-t plane of the image sequence corresponding to line x is extracted. At step 518, this x-t plane is filtered and classified, as described above. Step 520 determines if the value in x indicates that the last row of the image has been processed. If not, the value x is incremented in step 522 and control returns to step 516 to filter the next row.

Steps 524, 526, 528, 530, 532 and 534 that implement the y-t filtering are analogous to the corresponding steps 512, 514, 516, 518, 520 and 522, described above and are not described herein. After both the last row and the last column of the image sequence have been processed at steps 520 and 532, the |R−L| and |U−D| classified images are processed, as described above using the difference of Gaussian operator to identify boundary regions for coherent motion in the image sequence. This information is passed on to step 538. Step 538 represents a third parallel process. While one sequence of images is being classified according to steps 510–536, described above, the preceding image sequence is being processed by block 538. This preceding image sequence, thus, represents a delayed version of the image sequence provided at step 510. This delayed image sequence is provided at step 540 to the processing step 538. Step 538, which may, for example, be an automatic surveillance processor, may process only the image regions that are indicated by the boundaries determined at step 536 as containing coherent motion. At step 542, the results of this processing are presented for display. Note that the processing may proceed in the absence of the explicit boundary detection step, that is to say, processing may be based purely on regional properties, for example, as provided by the classifier step 424 in FIG. 4.

The main implication of the current effort is that spatiotemporal filtering can be used to classify real-world images directly in terms of rather abstract information, i.e., the six proposed categories of spatiotemporal structure: structureless, static, flicker, coherent motion, incoherent motion and scintillation.

Operations have been described at a single spatiotemporal scale; however, the proposed representation is a natural candidate for multiscale extensions. Indeed, such extensions might support finer distinctions among categories of spatiotemporal structure as characteristic signatures may be manifest across scale. Two kinds of extension are contemplated. The first concerns varying the region of (spatiotemporal) integration that is applied to the oriented energy measures. The second type of multiscale extension concerns the frequency tuning of the underlying oriented filters. A systematic extension in this regard may, for example, operate at a number of spatial frequency bands (e.g. by performing a pyramid decomposition of each of the images instead of the orthogonal filtering) and, for each of these bands, perform the analysis for a number of temporal frequency bands to generate a number of spatiotemporal sub-descriptors that are then combined to define an appropriate set of spatiotemporal descriptors. Alternatively, the various spatiotemporal sub-descriptors may be used to tile the frequency domain and correspondingly characterize the local orientation structure of an input spatiotemporal volume. These two extensions serve distinct purposes that are perhaps best understood with respect to a simple example. Consider a typically complex outdoor scene containing a tree blowing in a gusty wind and illuminated by a sunny sky with a few drifting clouds in it. As the tree branches sway back and forth, the corresponding image motion will be locally and temporarily coherent. However, over longer periods of time or over larger areas it will be incoherent or oscillatory. Thus, the characterization of the spatiotemporal structure will shift from one category to the other as the region of analysis is extended. Now consider the effect of a cloud shadow passing across the tree. At a fine spatial scale (i.e., for a high spatial frequency underlying filter) it will appear as an illumination variation thus having a component in the "flicker" category. At the scale of the shadow itself (i.e., at low spatial frequency) it will look like coherent motion as the cloud passes over. The pattern of spatiotemporal signatures taken as a function of scale thus captures both the structural complexities of the dynamic scene and the quasi-transparency of complex illumination. These two types of scaling behavior are complimentary and taken in tandem serve to enrich the descriptive vocabulary of the approach.

Although the invention has been described in terms of specific filter implementations, it is contemplated that other types of filters may be employed to generate the component terms used to classify the regions of the image sequence. These include oriented Gabor filters, as described in an article by D. Heeger entitled "A model for the Extraction of Image Flow" *JOSA A* 4 PP1455–1471 (1987) and lognormal filters, as described in the above-identified text by Granlund et al. Similarly, one might be concerned with issues of causality and use oriented spatiotemporal filters that respect time's arrow. Also, one might consider a more uniform sampling of orientation in x-y-t-space, rather than relying on x-t and y-t planes. Furthermore, additional dimensions may be analyzed, for example three spatial dimensions plus time. This is the case, for example, if three-dimensional images from a magnetic resonance imaging (MRI) device are analyzed for classification. It is contemplated that even more dimensions may be used, for example, sequences of three-dimensional MRI images taken over a sequence of several years.

The type of qualitative analysis described here seems particularly suited to processing in biological vision systems because of the apparently hierarchical nature of biological computation and the importance of such factors as attention. It is interesting therefore to note aspects of biological processing that relate to the current approach. With respect to fineness of sampling in the spatiotemporal domain, it appears that humans employ only about two to three temporal bands, while making use of six or more spatial bands. Also, there is evidence that biological systems combine motion tuned channels in an opponent fashion, as is done in the current work. Regarding the degree to which filter responses are spatially integrated (i.e., as part of computing aggregate properties of a region) biological systems seem to be rather conservative: Physiological recordings of visual cortex complex cells indicate integration regions on the order of two to five cycles of the peak frequency, suggesting a preference for preservation of spatial detail over large area summation. It also is interesting to note that human contrast sensitivity is on the order of one percent, an amount that has proven useful analogously in the current work as a choice for the bias in the process of energy normalization, described with reference to equation (2). With regard to border analysis, part of a purported mechanism for the detection of relative movement in the fly makes use of spatially antagonistic motion comparisons, in a fashion suggestive of the approach taken by the present invention.

A number of applications are contemplated for the subject invention, falling into two broad areas of potential impact. The first type of application concerns front end processing for real-time vision tasks. In this capacity, the present invention can provide an initial organization, thereby focusing subsequent processing on portions of the data most relevant to critical concerns (e.g., distinguishing static, dynamic and low information regions of the scene). The second type of application concerns issues in the organization and access of video sequences. Here, the proposed representation could be used to define feature vectors that capture volumetric properties of spatiotemporal information (e.g., space-time texture) as an aid to the design and indexing of video databases. More generally, the proposed approach may be appropriate to a variety of tasks that could benefit from the early organization of spatiotemporal image data. In this regard, it is noted that the images need not be visual images. They may, for example, consist of data on pressure fields or some other scalar quantity given as a function of spatial or other multidimensional coordinates and a temporal coordinate.

While the subject invention has been described in terms of a hardware embodiment, it is contemplated that it may be practiced entirely in software on a programmed computer. Such software may be embodied in a computer-readable carrier such as an magnetic memory card, an integrated circuit, a magnetic or optical disk, or a radio-frequency or audio-frequency carrier wave.

Although the invention has been described in terms of exemplary embodiments, it is contemplated that it may be practiced as described above with variations within the scope of the following claims.

What is claimed:

1. A method to generate a plurality of relevant spatiotemporal descriptors for a sequence of N-dimensional data sets, each data set including a plurality of scalar quantifies arranged in the N-dimensional coordinates and a temporal coordinate, where N is an integer, the method, comprising the steps of:
    (a) filtering a volume of die scalar quantities according to a plurality of oriented filter characteristics to produce a respective plurality of spatiotemporal filter values corresponding to the scalar quantities in the selected volume; and
    (b) determining the plurality of relevant spatiotemporal descriptors directly from the plurality of spatiotemporal filter values;
wherein;
    at least one of the plurality of relevant spatiotemporal descriptors is determined from at least two of the plurality of spatiotemporal filter values; and
    the plurality of relevant spatiotemporal descriptors includes at least one descriptor of image information other than coherent motion.

2. A method according to claim 1, wherein the volume is a plane of scalar quantities and step (a) further includes the step of filtering each image in the sequence of data sets in a spatial direction orthogonal to the plane of scalar quantities.

3. A method according to claim 1, wherein the plurality of relevant spatiotemporal descriptors are selected from a set of spatiotemporal descriptors including unstructured, static, flicker, coherent motion, incoherent motion, and scintillation.

4. A method according to claim 1, wherein step (a) includes the step of filtering the volume of scalar quantities to determine the plurality of filter values corresponding to the scalar quantities of the volume using at least one of an oriented energy filter, an angularly tuned Gabor filter, a lognormal filter, and a derivative of Gaussian filter.

5. A method according to claim 1, wherein the step (b) includes the step of filtering the volume of scalar quantities to determine the plurality of filter values corresponding to the scalar quantities using at least one derivative of Gaussian filter and its corresponding Hilbert transform filter.

6. The method of claim 1, further comprising the step of filtering a subset of the plurality of filter values to determine a boundary between respective first and second regions of scalar quantities of the volume, the first region of scalar quantities having a common relevant spatiotemporal descriptor.

7. The method of claim 6, wherein the step of filtering a subset of the plurality of filter values to determine the boundary between the first and second regions of scalar quantities in the volume, includes the step of filtering the subset of the plurality of filter values applying a difference of Gaussians operator to generate a plurality of boundary filter values.

8. A method according to claim 1, wherein step (a) includes the steps of:
   (a1) defining a plurality of spatiotemporal sub-band data sets for the volume of scalar quantities; and
   (a2) filtering at least one spatiotemporal sub-band image of the plurality of spatiotemporal sub-band data sets to determine the plurality of filter values corresponding to the plurality of scalar quantities of the volume.

9. A method according to claim 8, wherein:
   the at least one spatiotemporal sub-band data set includes at least two spatiotemporal sub-band data sets; and
   step (b) includes the steps of;
      (b1) determining a first plurality of spatiotemporal sub-descriptors responsive to a subset of the filter values corresponding to a first spatiotemporal sub-band data set of the at least two spatiotemporal sub-band data sets;
      (b2) determining a second plurality of spatiotemporal sub-descriptors responsive to a subset of the filter values corresponding to a second spatiotemporal sub-band data set of the at least two spatiotemporal sub-band data sets; and
      (b3) determining the plurality of relevant spatiotemporal descriptors responsive to the plurality of first spatiotemporal sub-descriptors and the plurality of second-spatiotemporal sub-descriptors.

10. A method according to claim 1, wherein the sequence of data sets includes only every N-th data set in a group of consecutive data sets, where N is an integer greater than 1.

11. A method according to claim 10, further including the steps of:
   generating a first set of descriptors by performing steps (a) and (b) with N equal to a first integer I;
   generating a second set of descriptors by performing steps (a) and (b) with N equal to a second integer K; and
   combining the first set of descriptors and the second set of descriptors to generate the plurality of relevant spatiotemporal descriptors.

12. A method to generate a plurality of relevant spatiotemporal descriptors for a sequence of N-dimensional data sets, each data set including a plurality of scalar quantities arranged in the N-dimensional coordinates and a temporal coordinate, where N is an integer, the method, comprising the steps of:
   (a) filtering a volume of the scalar quantifies according to a plurality of oriented filter characteristics to produce a respective plurality of spatiotemporal filter values corresponding to the scalar quantities in the selected volume; and
   (b) determining the plurality of relevant spatiotemporal descriptors responsive to the plurality of spatiotemporal filter values;
   wherein the plurality of oriented filter characteristics in step (a) include: a first direction motion filter characteristic, a second direction motion filter characteristic, a static filter characteristic, and a flicker filter characteristic.

13. A method to generate a plurality of relevant spatiotemporal descriptors for a sequence of video images, each video image including a plurality of pixels arranged in a matrix having a plurality of horizontal rows and a plurality of vertical columns, comprising the steps of:
   (a) storing the sequence of video images as a three dimensional array having an x dimension corresponding to the horizontal rows of pixels in the video images, a y dimension corresponding to the vertical columns of pixels in the video images, and a t dimension corresponding to other images in the sequence;
   (b) filtering each image in the sequence of video images using a one-dimensional spatial filter oriented in the y dimension;
   (c) selecting a plane of pixels of the sequence of video images corresponding to the t dimension and the x dimension;
   (d) filtering the selected plane of pixels to produce a plurality of horizontal spatiotemporal filter values corresponding to the pixels in the selected plane of pixels; and
   (e) determining the plurality of relevant spatiotemporal descriptors responsive to the plurality of horizontal spatiotemporal filter values.

14. A method according to claim 13, further including the steps of:
   (f) filtering each image in the sequence of video images using a one-dimensional spatial filter oriented in the x dimension;
   (g) selecting a plane of pixels of the sequence of video images corresponding to the t dimension and the y dimension;
   (h) filtering the selected plane of pixels to produce a plurality of vertical spatiotemporal filter values corresponding to the pixels in the selected plane of pixels;
   wherein step (e) includes the step of determining the plurality of relevant spatiotemporal descriptors responsive to the plurality of horizontal spatiotemporal filter values and the plurality of vertical spatiotemporal values.

15. A method of indexing a sequence of N-dimensional data sets of scalar quantities for storage in a database of N-dimensional data sets, where N is an integer, the method comprising the steps of:
   (a) filtering a volume of the scalar quantities using a plurality of oriented filter characteristics to produce a respective plurality of spatiotemporal filter values corresponding to the scalar quantities in the data sets;
   (b) combining the plurality of spatiotemporal filter values to define a corresponding plurality of spatiotemporal descriptors, wherein;
      at least one of the plurality of spatiotemporal descriptors is defined by at least two of the plurality of spatiotemporal filter values; and
      the plurality of relevant spatiotemporal descriptors includes at least one descriptor of image information other than coherent motion;
   (c) associating the plurality of spatiotemporal descriptors with the sequence of N-dimensional data sets as an index value; and
   (d) storing the sequence of N-dimensional data sets in the database.

16. A method of automatically selecting a region of interest of a scene using a sequence of N-dimensional data sets, each N-dimensional data set including a plurality of scalar quantities arranged in N-dimensions, where N is an integer, the method comprising the steps of:
  (a) filtering a volume of the scalar quantities to produce a plurality of spatiotemporal filter values corresponding to the scalar quantities data sets;
  (b) determining a plurality of relevant spatiotemporal descriptors directly from the plurality of spatiotemporal filter values, wherein the plurality of relevant spatiotemporal descriptors includes at least one descriptor of image information other than coherent motion; and
  (c) analyzing the plurality of spatiotemporal descriptors to identify the region of interest.

17. Apparatus for generating a plurality of relevant spatiotemporal descriptors for a sequence of video images, each video image including a plurality of pixels arranged in a matrix having a plurality of horizontal rows and a plurality of vertical columns, comprising:
  a memory for storing the sequence of video images as a three dimensional array having an x dimension corresponding to the horizontal rows of pixels in the video images, a y dimension corresponding to the vertical columns of pixels in the video images, and a t dimension corresponding to other images in the sequence;
  a plurality of filters which filter a volume of pixels to produce a respective plurality of spatiotemporal filter values corresponding to the pixels in the sequence of video images; and
  a classifier which determines the plurality of relevant spatiotemporal descriptors directly from the plurality of spatiotemporal filter values;
wherein;
  at least one of the plurality of relevant spatiotemporal descriptors is determined from at least two of the plurality of spatiotemporal filter values; and
  the plurality of relevant spatiotemporal descriptors includes at least one descriptor of image information other than coherent motion.

18. Apparatus according to claim 17, wherein the plurality of filters include a plurality of oriented low-pass filters including:
  a first filter oriented in the temporal dimension;
  a second filter oriented in the at least one of the x-dimension and the y-dimension; and
  a third filter oriented in a direction including both the temporal dimension and the at least one of the x-dimension and the y-dimension.

19. Apparatus according to claim 18, further including a fourth filter oriented in a direction opposite to the orientation direction of the third filter.

20. Apparatus according to claim 19, wherein each of the first, second, third and fourth filters includes a second derivative Gaussian filter and its corresponding Hilbert transform filter.

21. A computer-readable carrier including computer program instructions that instruct a computer to generate a plurality of relevant spatiotemporal descriptors for a sequence of video images, each video image including a plurality of pixels arranged in a matrix having a plurality of horizontal rows and a plurality of vertical columns, comprising the steps of:
  (a) storing the sequence of video images as a three dimensional array having an x dimension corresponding to the horizontal rows of pixels in the video images, a y dimension corresponding to the vertical columns of pixels in the video images, and a t dimension corresponding to other images in the sequence;
  (b) filtering a volume of pixels to produce a plurality of spatiotemporal filter values corresponding to the pixels in sequence of video images; and
  (c) determining the plurality of relevant spatiotemporal descriptors directly from the plurality of spatiotemporal filter values;
wherein;
  at least one of the plurality of relevant spatiotemporal descriptors is determined from at least two of the plurality of spatiotemporal filter values; and
  the plurality of relevant spatiotemporal descriptors includes at least one descriptor of image information other than coherent motion.

* * * * *